(12) United States Patent
Tang

(10) Patent No.: US 9,178,720 B2
(45) Date of Patent: *Nov. 3, 2015

(54) COMMON ROUTING

(71) Applicant: iBasis, Inc., Burlington, MA (US)

(72) Inventor: Hwanjang Tang, Concord, MA (US)

(73) Assignee: iBasis, Inc., Burlington, MA (US)

(*) Notice: Subject to any disclaimer, the term of this patent is extended or adjusted under 35 U.S.C. 154(b) by 274 days.

This patent is subject to a terminal disclaimer.

(21) Appl. No.: 13/945,517

(22) Filed: Jul. 18, 2013

(65) Prior Publication Data

US 2013/0301638 A1 Nov. 14, 2013

Related U.S. Application Data

(63) Continuation of application No. 12/705,043, filed on Feb. 12, 2010, now Pat. No. 8,509,222.

(51) Int. Cl.
| | |
|---|---|
| *H04W 40/20* | (2009.01) |
| *H04L 12/28* | (2006.01) |
| *H04L 12/66* | (2006.01) |
| *H04L 12/26* | (2006.01) |
| *H04L 12/56* | (2006.01) |
| *G06F 15/16* | (2006.01) |
| *G06F 15/173* | (2006.01) |
| *H04L 12/64* | (2006.01) |

(Continued)

(52) U.S. Cl.
CPC .............. *H04L 12/64* (2013.01); *H04M 3/42* (2013.01); *H04M 15/8044* (2013.01); *H04M 2215/42* (2013.01)

(58) Field of Classification Search
CPC ..... H04L 49/3009; H04L 12/66; H04L 12/64; H04L 67/20

USPC .............. 370/229–238, 352–356, 395.2, 252; 379/114.02–114.1, 219–222, 272–274; 455/445

See application file for complete search history.

(56) References Cited

U.S. PATENT DOCUMENTS

| | | |
|---|---|---|
| 5,377,186 A | 12/1994 | Wegner et al. |
| 5,467,391 A | 11/1995 | Donaghue, Jr. et al. |

(Continued)

FOREIGN PATENT DOCUMENTS

| | | |
|---|---|---|
| WO | WO 96/11551 | 4/1996 |
| WO | WO 00/36815 | 6/2000 |
| WO | WO 2011/100238 A1 | 8/2011 |

OTHER PUBLICATIONS

Notification of Transmittal of the International Search Report and the Written Opinion of the international Searching Authority, or the Declaration, dated May 23, 2011, for Application No. PCT/US2011/024037, consisting of 11 pages.

*Primary Examiner* — Wutchung Chu
(74) *Attorney, Agent, or Firm* — Hamilton, Brook, Smith & Reynolds, P.C.

(57) ABSTRACT

In an embodiment, call routing from a customer to a destination is provided by intercepting a call setup message sent from a customer switch intended to signal a switch to perform a call routing function. In response to the call setup message being intercepted, a routing engine is queried with the destination of the call for a specific route over which to carry the call to the destination. The call setup message is modified to include the specific route. The switch is directed with the modified call setup message to use the specific route to carry the call from the customer to the destination.

19 Claims, 11 Drawing Sheets

(51) Int. Cl.
*H04M 3/42* (2006.01)
*H04M 15/00* (2006.01)

(56) References Cited

U.S. PATENT DOCUMENTS

| | | | |
|---|---|---|---|
| 5,555,290 A | 9/1996 | McLeod et al. | |
| 5,832,382 A | 11/1998 | Alperovich | |
| 5,933,412 A | 8/1999 | Choudhury et al. | |
| 6,014,379 A | 1/2000 | White et al. | |
| 6,035,198 A | 3/2000 | Wiehe | |
| 6,215,790 B1 * | 4/2001 | Voit et al. | 370/401 |
| 6,226,289 B1 * | 5/2001 | Williams et al. | 370/385 |
| 6,263,058 B1 | 7/2001 | Lautenschlager et al. | |
| 6,269,157 B1 | 7/2001 | Coyle | |
| 6,298,043 B1 | 10/2001 | Mauger et al. | |
| 6,396,840 B1 | 5/2002 | Rose et al. | |
| 6,496,508 B1 | 12/2002 | Breuckheimer et al. | |
| 6,570,855 B1 | 5/2003 | Kung et al. | |
| 6,678,368 B1 | 1/2004 | Harno | |
| 6,775,267 B1 | 8/2004 | Kung et al. | |
| 6,856,598 B1 * | 2/2005 | Stanfield | 370/235 |
| 7,043,001 B2 | 5/2006 | Moisey et al. | |
| 7,194,078 B2 * | 3/2007 | Stumer | 379/201.12 |
| 7,257,086 B2 | 8/2007 | Brown et al. | |
| 7,974,277 B2 * | 7/2011 | Bao et al. | 370/389 |
| 8,224,337 B2 * | 7/2012 | Gosnell et al. | 455/445 |
| 8,514,841 B2 * | 8/2013 | Bastien | 370/352 |
| 2002/0054674 A1 * | 5/2002 | Chang et al. | 379/207.02 |
| 2002/0064271 A1 | 5/2002 | Stumer | |
| 2002/0176557 A1 | 11/2002 | Burger | |
| 2003/0114160 A1 | 6/2003 | Verkama et al. | |
| 2003/0193957 A1 | 10/2003 | Cable et al. | |
| 2003/0210769 A1 | 11/2003 | Clark, Jr. et al. | |
| 2003/0215082 A1 | 11/2003 | Lopes et al. | |
| 2004/0042396 A1 | 3/2004 | Brown et al. | |
| 2005/0084090 A1 * | 4/2005 | Moisey et al. | 379/221.01 |
| 2007/0008894 A1 | 1/2007 | Lynch et al. | |
| 2007/0019544 A1 | 1/2007 | Ashwood Smith et al. | |
| 2008/0039104 A1 * | 2/2008 | Gu et al. | 455/445 |
| 2008/0198998 A1 | 8/2008 | Aleynikov | |
| 2009/0041225 A1 * | 2/2009 | Agarwal et al. | 379/221.13 |
| 2010/0202446 A1 * | 8/2010 | McCann et al. | 370/352 |
| 2011/0098049 A1 | 4/2011 | Gosnell et al. | |
| 2012/0208574 A1 * | 8/2012 | Chen | 455/466 |

* cited by examiner

COMMON ROUTING

RELATED APPLICATION

This application is a continuation of U.S. application Ser. No. 12/705,043, filed Feb. 12, 2010. The entire teachings of the above application are incorporated herein by reference.

BACKGROUND

In Internet telephony, least cost routing is a process that provides customers with inexpensive telephone calls. Providers offering routes to destinations are selected, evaluated, and removed based on call quality and other measures to maintain a competitive cost base and acceptable call quality. A provider is selected from a set of providers represented by a routing table. The routing table includes a cost of each provider offering a route to the destination that enables least cost routing.

SUMMARY

An example embodiment of the present invention may be implemented in the form of a method or corresponding apparatus for routing a call from a customer to a destination. The method and corresponding apparatus according to one embodiment of the present invention includes intercepting a call setup message sent from a customer switch to a switch intended to signal the switch to perform a call routing function or request a call routing function be performed. Typically, the call routing function determines a route for the switch to use to carry the call to the destination. Such a determined route is referred to as a switch-determined route. The embodiment also intercepts a call release message sent from the switch to the customer switch intended to signal the customer switch of network congestion. In response to either the intercepted call setup message or the intercepted call release message, the embodiment queries a routing engine with the destination of the call for a specific route over which to carry the call to the destination. The specific route is queried from a set of routes that is different from another set of routes from which the call routing function determines the switch-determined route. The embodiment modifies the intercepted call setup message to include the specific route. The call setup message so modified is referred to as a modified call setup message. The embodiment responds to the call release message with a re-route call message that includes the specific route. The embodiment directs the switch with either the modified call setup message or the re-route call message to use the specific route to carry the call from the customer to the destination.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

In the wholesale telephony industry, multiple providers offer routes to a destination. Which provider provides the route or otherwise takes a call, depends in part on the capacity utilization of the provider at the time of the call. As such, the costs for calls to the same destination can be different. In least cost routing, the provider offering a route to the destination at the least cost (referred to simply as the "least cost provider") provides the route to the destination. If the least cost provider is unable to route the call, e.g., due to insufficient capacity, then the "next least cost provider" routes the call to the destination. Least cost routing is enabled by routing tables that include providers and their costs. However, as will be described, these routing tables enable least cost routing to limited degree and present other shortcomings.

Figure 1:
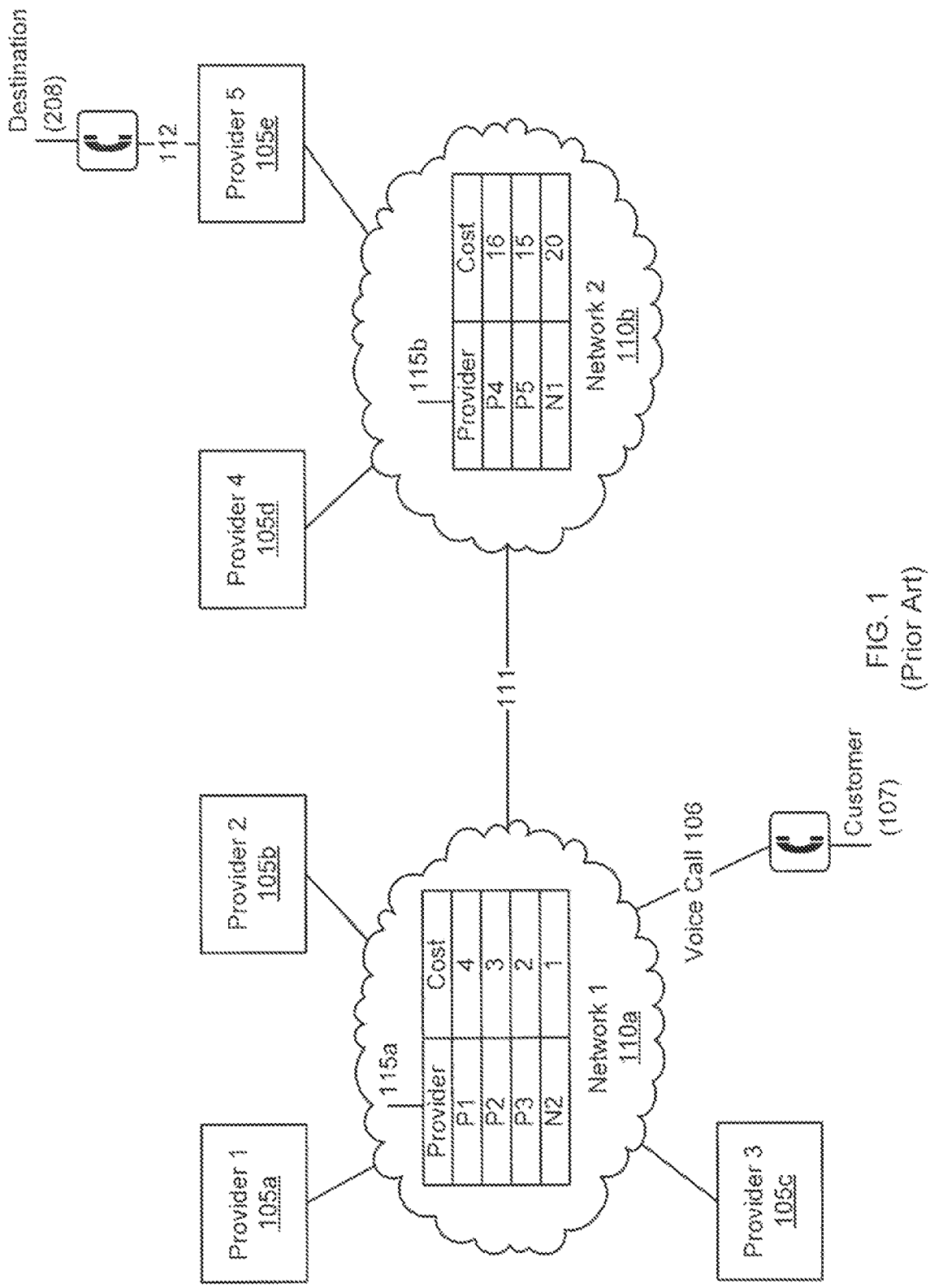
FIG. 1 is a network diagram of the prior art.

FIG. 1 illustrates providers P1 through P5, 105*a-e*, each providing a route to a destination or otherwise routing a call to the destination. The providers P1 through P3, 105*a-c*, are organized in a first network 110*a*. The providers P4 through P5, 105*d-e*, are organized in a second network 110*b*. The first network 110*a* and second network 110*b* represent, for example, TDM networks (or other circuit-based networks), VoIP networks (or other packet-based networks) or any combination thereof. There may be more or fewer networks. As organized, the first network 110*a* is not aware of the providers P4 through P5, 105*d-e*, of the second network 110*b*. Similarly, the second network 110*b* is not aware of the providers P1 through P3, 105*a-c* of the first network 110*a*. Each network does not consider the providers of the other network individually. Rather the first network 110*a* considers the second network 110*b*, collectively, as a provider, and vice versa.

The first and second networks 110*a-b* each maintain routing tables of providers and their costs to enable least cost routing. As noted above, the first and second networks 110*a-b* each considers the other network as a provider. This is reflected in a first routing table 115*a* and a second routing table 115*b* of the first and second networks 110*a-b*, respectively. Using the first routing table 115*a* as an example, because the providers of the second network 110*b*, viz., the providers P4-P5, 105*d-e*, are not considered, individually, but are considered, collectively, as the second network 110*b* (denoted in the FIG. 1 as N2), the cost to provide a route to the destination is not the actual cost of the provider P4 105*d* or the provider P5 105*e* providing the route. The cost may be an arbitrary value, a value configured by an operator of the first network 110*a* or a value derived from the cost of the providers P4-P5, 105*d-e*, such as an average of their costs.

In the example illustrated in FIG. 1, a call 106 from a customer 107 to a destination 108 originates in the first network 110*a*. In the first network 110*a*, a least cost routing process determines, according the first routing table 115*a*, that the least cost provider of a route to the destination 108 is the second network 110b (having a cost of 1). The call 106 is routed over a route 111 provided by the second network 110b to the second network 110b.

With the call 106 routed to the second network 110b, another least cost routing process (different from the process in the first network 110a) determines, according to the second routing table 115b, that the least cost provider of a route to the destination 108 is the provider P5 105e (having a cost of 15). The call 106 is then carried from the second network 110b over a route 112 offered by the provider P5 105e to the destination 108.

The cost may be an arbitrary value, a value configured by an operator of a network or a value derived from a provider cost(s). In any case, least cost routing using either the first or second routing table 115a-b, is not accurate because it does not consider the cost of the providers individually.

Maintaining and updating separate routing tables, such as the first routing table 115a and the second routing table 115b requires more resources, than, for example, maintaining one routing table. A network is rarely static and undergoes frequent changes. For example, some providers are removed while others are added. Provider costs also change as the network topology changes. To reflect changes in the network, a routing table for the network is updated. Updating a routing table requires not only network and computing resources, such as bandwidth, processing cycle, and memory space, but also requires time. Separate routing tables further increase the demand for such resources.

A call data record (CDR) is a network's account of a call. In a situation in which a call is routed over more than one network, each network accounts for only a portion of the call. Consequently, CDRs from each network need to be reconciled (or otherwise combined) with one another in order put together a complete account of the call. Referring again to the example illustrated in FIG. 1, the call 106 originates in the first network 110a and is carried over the route 111 provided by the second network 110b to the second network 110b. As such, in the first network 110a, a first CDR of the call 106 records the second network 110b, not the provider P5 105e, as providing the route 111 and the cost of the second network 110b providing the route 111. The call 106 is then carried from the second network 110b over the route 112 offered by the provider P5 105e to the destination 108. As such, in the second network 110b, a second CDR records the provider P5 105e as providing the route 112 to the destination 108 and the cost of the provider P5 105e providing the route 112.

The first and second CDRs each account for only a portion of the call and are by themselves an incomplete account of the call. A complete account of the call (e.g., for billing purposes) requires reconciling the first and second CDRs. For example, adding the cost of routing the call 106 to the second network 110b over the route 111 to the cost of routing the call 106 to the destination over the route 112. Other arrangements between operators of each network are possible, e.g., a credit/debit arrangement. Reconciliation, however, can only occur after the call finishes. As such, the fact that each network has an incomplete or partial view of the call necessitates reconciling CDRs. This adds complexity and delay.

In summary, some of the shortcomings of using separate routing tables include: i) causes inaccurate least cost routing; ii) requires additional resources; iii) necessitates reconciling CDRs.

Figure 2:
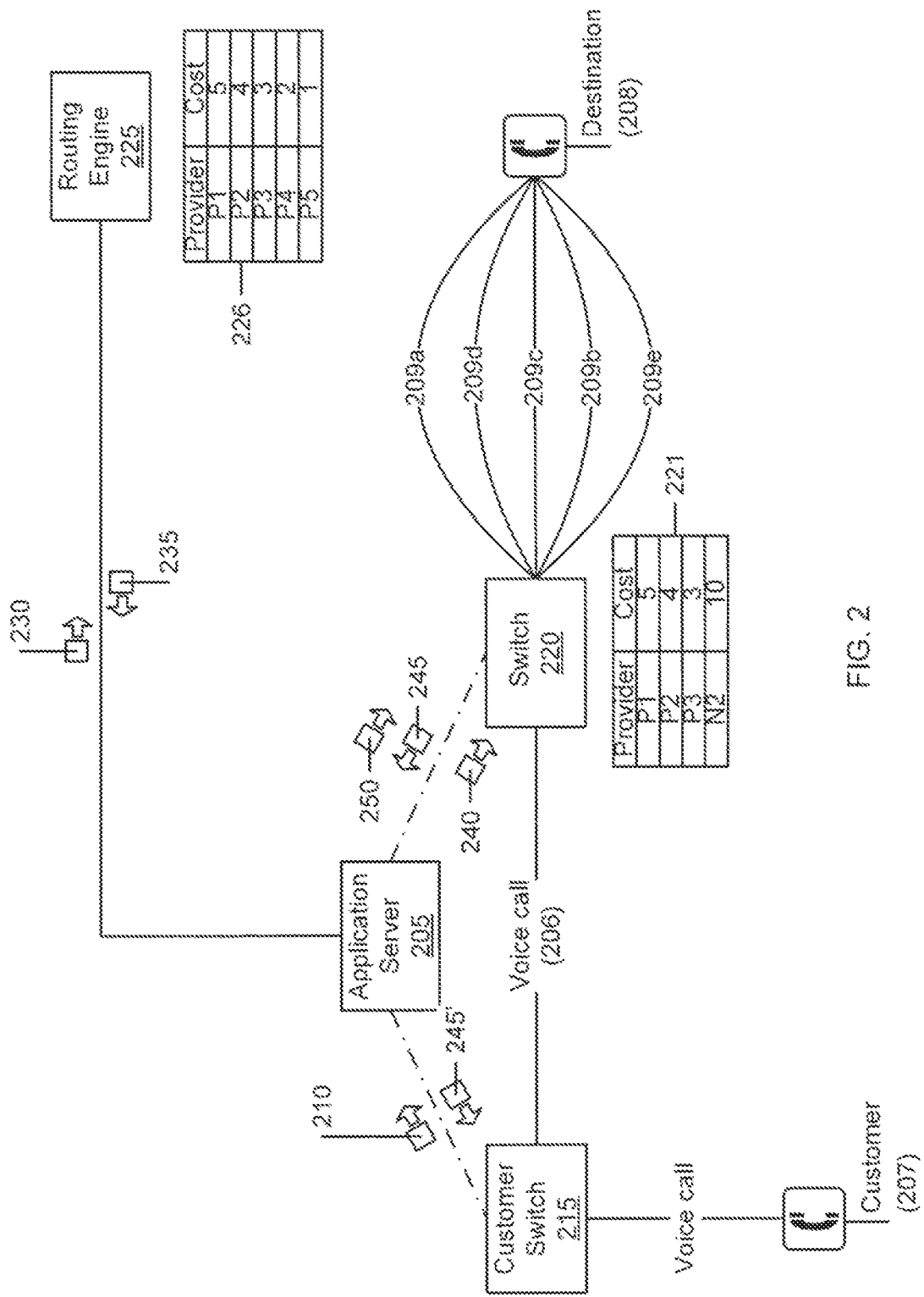
FIG. 2 is a network diagram of example network in which various embodiments may be implemented.

FIG. 2 illustrates an application server 205, in accordance with one embodiment, routing a call 206 from a customer 207 to a destination 208. Providers P1 through P5, each offer a route 209a-e, respectively, to the destination 208. The routes have decreasing costs, with the route 209a offered by the provider P1 having greatest cost and the route 209e offered by the provider P5 having least cost.

The application server 205 intercepts a call setup message 210 sent from a customer switch 215 to a switch 220. Normally, the call setup message 210 signals or otherwise instructs the switch 220 to perform a call routing function or request a call routing function to be performed. In this way, the intercepted call setup message 210 is intended to signal the switch 220 to perform a call routing function or request a call routing function to be performed. In the example illustrated in FIG. 2, the call setup message 210 is sent from the customer switch 215 over a path different from the call 206, i.e., "out-of-band." The out-of-band call signaling message may be, for example, any one of: Signaling System Number 7 (SS7), Common Channel Signaling System 7 (CCS7), and Session Initiation Protocol (SIP). The intercepted call setup message 210 includes, for example, Initial Address Message (IAM) and Initial Address Message with Additional Information (IAI) from the Integrated Services Digital Network (ISDN) User Part (ISUP) of the SS7 set of protocols. The IAM/IAI is sent in the "forward" direction by each switch needed to complete a call (or circuit) between a calling party and called party until the call connects to the destination switch. The IAM/IAI contains the called party number Typically, the call routing function determines a route for the switch 220 to use to carry the call 206 to the destination 208. The switch-determined route is determined from a set of routes represented by a routing table 221 (such as the first routing table 115a of FIG. 1). As described in reference to FIG. 1, the routing table 221 does not represent providers of another network individually. Instead, the routing table 221 represents the providers of another network collectively. In the example illustrated in FIG. 2, the routing table 221 includes individual providers P1, P2, and P3, and their costs for providing the routes 209a-c, respectively, for those providers known to be in the network to which the switch 220 belongs or otherwise resides. The routing table 221 further includes a network (denoted in FIG. 2 as N2) as a provider and a cost for using the network to provide a route to the destination 208. Effectively, the network stands in for providers of that network, collectively.

According to the routing table 221, the route 209c offered by the provider P3 is the least cost route. This, however, is incorrect and inaccurate. The route 209e provided by the provider P5 is the least cost route having a cost of 1 that is less than the route 209a having a cost of 5. Because the routing table 221 does not include the provider P5, individually, but only collectively as the network N2, the least cost route cannot be determined from the routing table 221 accurately.

The application server 205 also intercepts a call release message 245 sent from the switch 220 to the customer switch 215 intended to signal the customer switch 215 of network congestion. The call release message 245 may indicate a cause or reason for a call (or circuit) being released. The application server 205 may be conditioned to pass and not intercept call release messages that do not indicate network congestion as the cause. For example, the application server 205 may pass a call release message (denoted in FIG. 2 as 245') to the customer switch 215 that indicates that a called party line is busy or that a called party "hangs up" the call. The intercepted call release message 245 includes, for example, Release Message (REL) from ISUP of the SS7 set of protocols.

The application server 205, in response to intercepting either the call setup message 210 or the call release message 245, queries a routing engine 225 for a specific route over which to carry the call 206 to the destination 208. In one embodiment, the application server 205 queries the routing engine 225 with a query message or signal 230 that includes the destination of the call. The specific route is queried from another set of routes represented by a common routing table 226. The set of routes represented by the routing table 221 and the set of routes represented by the common routing table 226 are different. In the example illustrated by FIG. 2, as contrasted with the routing table 221, the common routing table 226 includes providers, individually, viz., providers P4 and P5 and not collectively as the network N2.

As such, according to one embodiment, the application server 205 queries for the specific route from a set of routes that is different from another set of routes from which the call routing function determines the switch-determined route. Furthermore, the specific route and the switch-determined route are not necessarily the same.

Unlike the routing table 221, the common routing table 226 represents providers individually. The common routing table 226 represents providers and their cost without being limited to a particular network. In the example illustrated in FIG. 2, the common routing table 226 includes individual providers P1 through P5, and their costs for providing the routes 209*a-c*, respectively. As illustrated and according to one embodiment, the application server 205 queries the routing engine 225 for the specific route from the set of routes represented by the common routing table 226. The common routing table 226 has routes in addition to those of the other set of routes represented by the routing table 221, viz., additional routes associated with another network provided by the providers P4 and P5.

According to the common routing table 226, the route 209*e* offered by the provider P5 is the least cost route. This is contrasted with the route 209*c* offered by the provider P3, the least cost route determined according to the routing table 221. The route 209*e* has a cost of 1 and the route 209*a* has cost of 5. 1 being less then 5, the route 209*e* is the least cost route. The route 209*a* is not. Thus, least cost route according to the routing table 221 is not accurate. In contrast, the common routing table 226 includes the providers P1 through P5, and the routes 209*a-e* that they offer, individually, and, as such, the least cost route can be determined from the routing common routing table 226 accurately.

According to another embodiment, the application server 205 re-queries the routing engine 225 with the destination of the call for an alternate route over which to carry the call 206 to the destination 208 in an event the specific route is unable to carry the call 206 to the destination 208. In one example, in a typically least cost routing manner, the specific route is the least cost route (i.e., being provided by the least cost provider) and the alternate route is the next least cost route (i.e., being provided by the next least cost provider). In this example, the application server 205 continues to re-query for routes having next least costs until a route is able to carry the call 206 to the destination 208.

The application server 205 modifies the call setup message 210 to include the specific route and produces a modified call setup message 240. In the example illustrated in FIG. 2, the application server 205 receives the specific route in a response message or signal 235. In another example, the application server 205 selects the specific route from among several routes provided by the routing engine 225. The application server 205 may receive several routes in a message similar to the response message 235.

The application server 205 responds to the call release message 245 with a re-route call message 250 that includes the specific route.

According to another embodiment, the application server 205 re-queries the routing engine 225 with the destination of the call for an alternate route over which to carry the call 206 to the destination 208 in an event the specific route is unable to carry the call 206 to the destination 208. In event there is no alternate route (e.g., all routes provided by the routing engine 225 have been exhausted), the application server 205 passes the call release message 245 to the customer switch 215.

The application server 205 directs the switch 220 to use the specific route to carry the call 206 to the destination 208 with either the modified call setup message 240 of the re-route call message 250.

In another embodiment, the application server 205 intercepts the call setup message 210 and the call release message 245 sent to and from the switch 220 operating in a first network. The application server 205 queries the routing engine 225 operating in a second network. The application server 205 directs the switch 220 with either the modified call setup message 240 of the re-route call message 250 to use the specific route to carry the call 206 from the customer 207 to the destination 208 located in a third network.

In this embodiment, the first, second, and third networks are different. It may be convenient to refer to the first, second, and third networks as an originating network, routing network, and destination network, respectively.

For example, in a convenient embodiment, the application server 205 intercepts the call setup message 210 and the call release message 245 sent to and from the switch 220 operating in a time-division multiplexed (TDM) network. The application server 205 queries the routing engine 225 operating in an Internet Protocol (IP) network. The application server 205 directs the switch 220 with either the modified call setup message 240 of the re-route call message 250 to use the specific route to carry the call 206 from the customer 207 to the destination 208 located in another TDM network. In this embodiment and others, the networks may include additional network elements to which the application server 205 is communicatively coupled. For example, in the TDM network (such as a Public Switched Telephone Network (PSTN)), the customer switch 215 and switch 220 are internetworked by one or more service transfer points (STP). In the example, the application server 205 is in communication with the STP. In the IP network, the application server 205 and routing engine 225 are internetworked by one or more gateways, routers or other routing and forwarding network elements.

The foregoing examples are not intended to limit the inventive concepts disclosed herein. For example, the customer switch 215 and switch 220 may operate in a SIP network having additional SIP network elements, such as a SIP proxy server, SIP registrar, and SIP redirect server. In this example, the application server 205 is in communications with one or more of these SIP network elements. The application server 205 intercepts a SIP signaling message from the customer switch 215 and directs the switch 220 with a modified SIP signaling message.

The destination may be identified in the call setup message 210 as a dialed number. The application server 205, according to one embodiment, appends a prefix to the dialed number. The appended prefix indicates the specific route to carry the call 206 from the customer 207 to the destination 208. The application server 205 directs the switch 220 to use the specific route indicated by the prefix that is appended to the dialed number.

In another embodiment, given a call signaling message that indicates or otherwise includes a duration of the call (or call duration), the application server 205 determines a cost for carrying the call 206 from the customer 207 to the destination 208 over the specific route as a function of the call duration and a rate for using the specific route. Such a call signaling message includes, for example, Answer Message (ANM) from ISUP of the SS7 set of protocols. The ANM initiates billing.

The application server 205 reports the cost in a Call Detail Record (CDR). Because the specific route used to carry the call is based on the common routing table 226 and the scope of the table is not limited to a particular network, the resulting CDR for the call 206 is a complete account of the call. As such, there are no partial accounts of the call to be reconciled. For example, in reference to FIG. 1, rather than reconciling the first CDR that accounts, partially, for the route being provided by the second network 110b with the second CDR that accounts, partially, for the route being provided by the provider P5 105e, a single CDR accounts for the route being provided by the provider P5 105e, completely.

Various embodiments described above enable selecting a provider from of a common routing table, referred to herein as "common routing," and address some or all of the shortcomings noted earlier. For example, one embodiment improves the accuracy of least cost routing over other techniques using separate routing tables by considering the cost of providers, individually and independent of network. Another embodiment (or the same embodiment) eliminates the need for additional resources to maintain and update separate routing tables by using a common routing table having a scope not limited to a particular network. For example, updating separate routing tables across networks requires the exchange of routing update messages and time for the networks to converge with the routing tables consistent with one another. The common routing table does not require the exchange of routing update messages or time for the networks to converge. Yet another embodiment (or the same embodiment) eliminates the need to reconcile CDRs and reduces complexity by using a common routing table having a scope not limited to a particular network.

Where there are multiple providers capable of providing a route or otherwise completing a call, the selection of a particular provider may be based on one or more considerations including the cost of completing the call through the provider (e.g., least cost routing), the quality of service offered by the provider, or other considerations. The provider may be selected from among others according to business rules including, for example, an agreed upon volume or percentage of traffic to be completed through a provider in a geographic region. For instance, there may be an agreement between a system operator (or wholesaler) and the provider that calls for the system operator to make minimum daily/monthly/yearly payments to a provider in exchange for the provider providing a predetermined number of minutes of service. In those circumstances, the system operator would want to make sure that the provider is used to place calls for at least the predetermined number of minutes each day/month/year before routing calls to other provider to ensure that the system operator derives the maximum amount of service from the provider in exchange for the minimum guaranteed payment. Business rules taking onto account these and other similar types of considerations can then be used to determine which provider to select and use.

Business rules can and do vary from network to network, as is the case with networks belonging to different wholesalers. Common routing enables disparate business rules to be unified under a common set of rules. This is especially useful to a wholesaler acquiring or merging networks with another wholesaler.

Returning to FIG. 2, the customer switch 215 and the switch 220 signal one another according to a protocol. In the context of the described embodiments, a protocol is a set of rules for networks elements, such as the customer switch 215 and switch 220, to communicate and interact with one another. A protocol is set forth in a standard by an organization, such as the Internet Engineering Task Force (IETF) and the International Telecommunication Union (ITU).

The application server 205, according to one embodiment, behaves in a manner substantially similar to the switch 220 being signaled by the customer switch 215 according to the protocol. The application server 205 intercepts the call setup message 210, transparently, and the customer switch 215 is unaware that the call setup message 210 is being intercepted. Further, the application server 205 behaves in a manner substantially similar to the customer switch 215 signaling the switch 220 according to the protocol. The application server 205 intercepts the call release message 245, transparently, and the switch 220 is unaware that the call release message 245 is being intercepted.

The application server 205 directs the switch 220, transparently, and the switch 220 is unaware of being directed by either the modified call setup message 240 or the re-route call message 250. For example, the application server 205 behaves in a manner substantially similar to the customer switch 215 and to the switch 220 by communicating and interacting with the customer switch 215 and switch 220 in accordance with the set of rules defined by the protocol. The application server 205 may copy all or some portion of communications between the customer switch 215 and switch 220, for example, copying a source point code (or address) and/or a destination point code (or address). The application server 205 may modify all or some portion of communications between the customer switch 215 and switch 220, for example, modifying a checksum used to check the integrity of the communications.

In some networks, communications between the customer switch 215 and switch 220 involve additional network elements, as described above. For example, in a time-division multiplexed (TDM) network (or other circuit-based network), the customer switch 215 and switch 220 (also known as services switch points (SSPs)) are internetworked by one or more service transfer points (STPs). In this example, the application server 205 behaves similar to the switch 220 being signaled by the customer switch 215 and similar to the customer switch 215 signaling the switch 220 by acting like an STP.

Figure 3A:
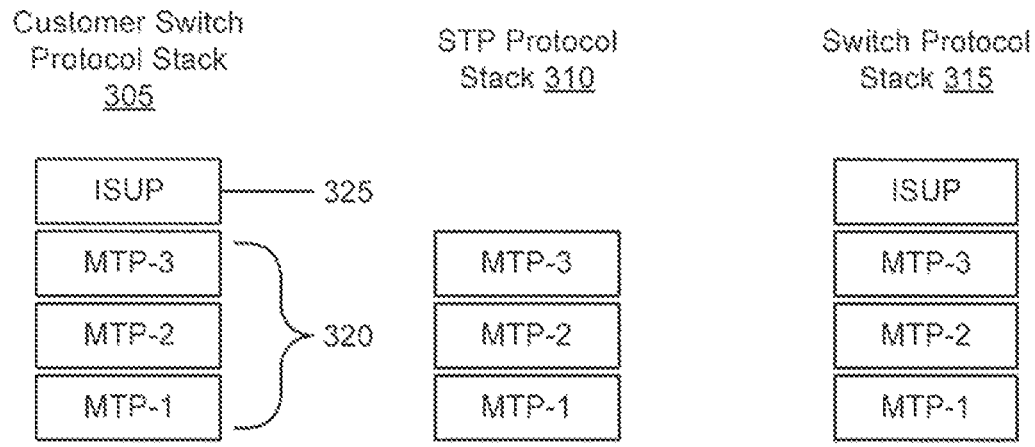
FIGS. 3A-3D are protocol stack diagrams.

FIG. 3A illustrates a customer switch protocol stack 305, STP protocol stack 310, and switch protocol stack 315. In this context, a protocol stack is a group or suite of software elements, each itself defined by a protocol, that interact or communicate with each other in conformance with a networking protocol to which they collectively relate. A customer switch (such as the customer switch 215 of FIG. 2) having the customer switch protocol stack 305 and a switch (such as the switch 220 of FIG. 2) having the switch protocol stack 315 are able to communicate with one another because the protocol stacks are the same.

The customer switch protocol stack 305 and the switch protocol stack 315 can be divided into lower protocol layers 320 (viz., Message Transfer Part Level 1 (MTP-1), Message Transfer Part Level 2 (MTP-2), and Message Transfer Part Level 1 (MTP-3)) and an upper protocol layer 325 (viz., Integrated Services Digital Network (ISDN) User Part (ISUP)). In contrast, the STP protocol stack 310 only includes the lower protocol layers 320 because the function of an STP is limited to internetworking the customer switch 215 to the switch 220 at these layers. An STP cannot read or otherwise access information or data transported in the upper protocol layer 325 nor is an STP concerned with such information. This is referred to as encapsulation in which logically separate functions in a network are abstracted from their underlying structures by inclusion or information hiding within higher level objects.

Figure 3B:
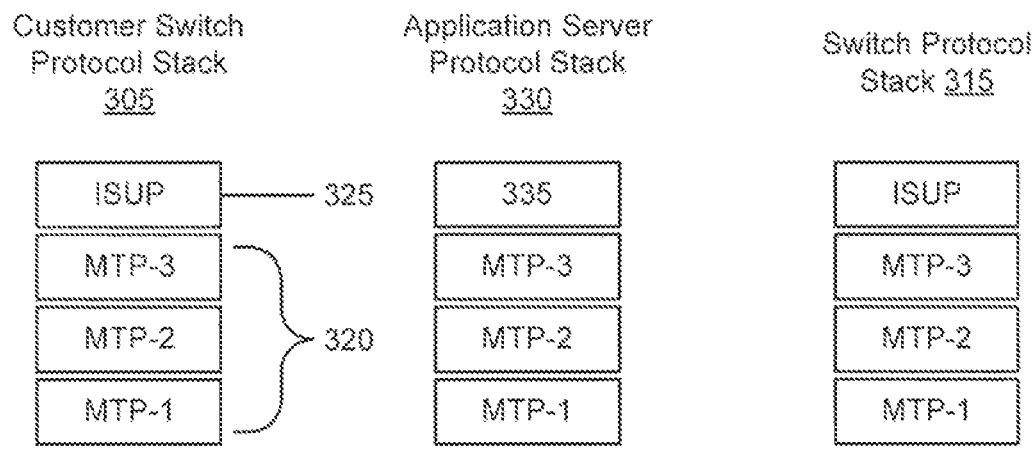

FIG. 3B illustrates the customer switch protocol stack 305 and the switch protocol stack 315 of FIG. 3A, and an application server protocol stack 330. The application server protocol stack 330 adds functionality to an application server (such as the application server 205 of FIG. 2) not found in a typical STP.

The application server protocol stack 330 includes a new protocol layer 335 above the lower protocol layers 320 that enables an application server (such as the application server 205 of FIG. 2) to read and modify ISUP messages, and direct a switch with modified ISUP messages. For example, an ISUP message communicated between the customer switch and switch includes a destination of a call in the form of a dialed number. The application server reads the ISUP message communicated from the customer switch and queries a routing engine (such as the routing engine 225 of FIG. 2) with the dialed number for a specific route, as described above in reference to FIG. 2. In contrast, an STP cannot read the ISUP message, and thus, does not know the dialed number. The application server modifies the ISUP message with the specific route (e.g., by appending a prefix to the dialed number) and directs the switch with the modified ISUP message, as described above in reference to FIG. 2.

The customer switch and switch, however, are not aware of the foregoing. The application server reading and modifying ISUP messages, and directing a switch with modified ISUP messages is transparent to the customer switch and switch.

Figure 3C:
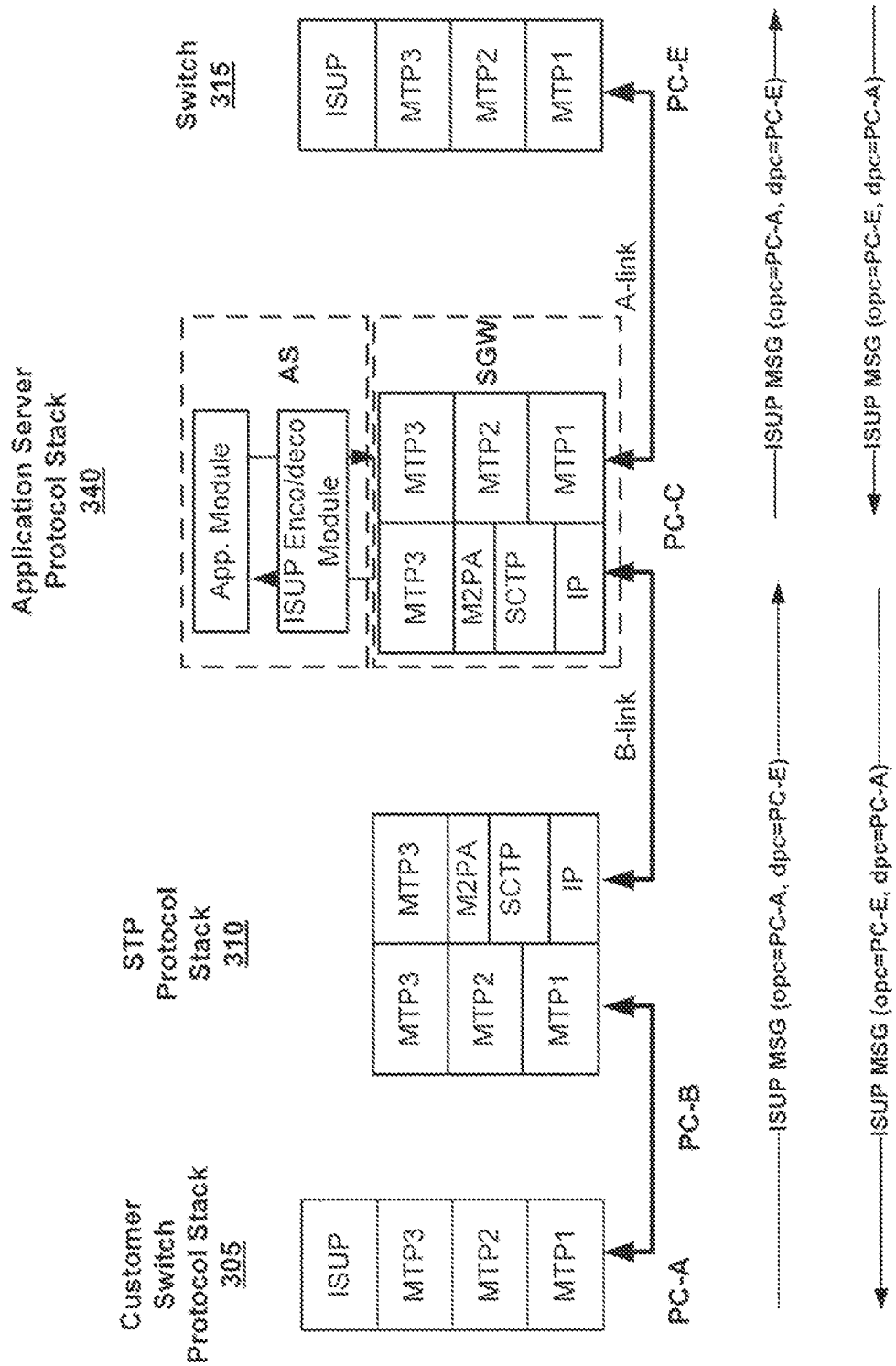
Figure 3D:
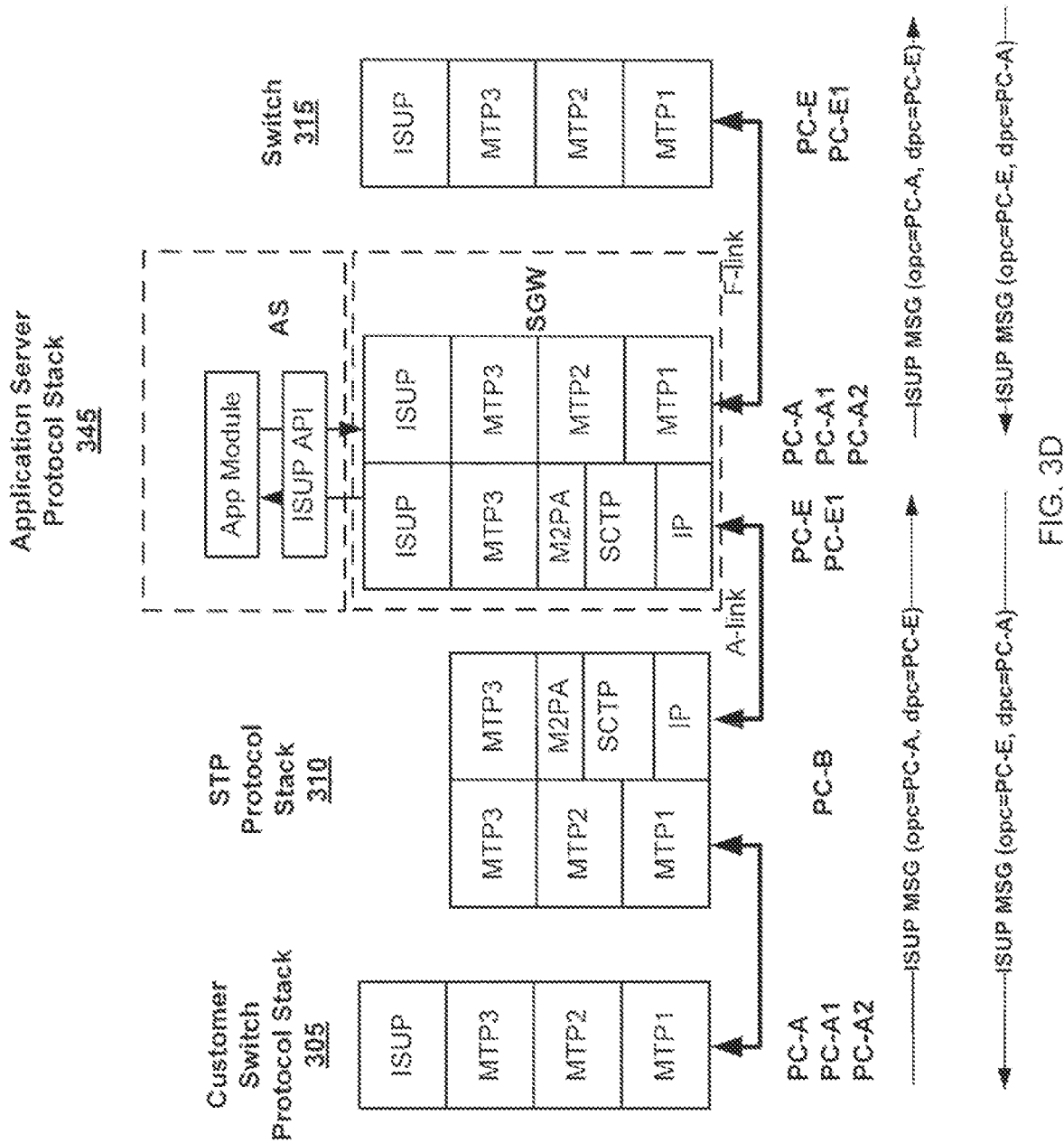

FIGS. 3C and 3D illustrate alternative application server protocol stacks 340 and 345, respectively. To intercept a call setup message or to direct a switch transparently, as described in reference to FIG. 2, a convenient embodiment may be implemented in accordance to one of the illustrated application server protocol stacks 340 and 345.

Figure 3E:
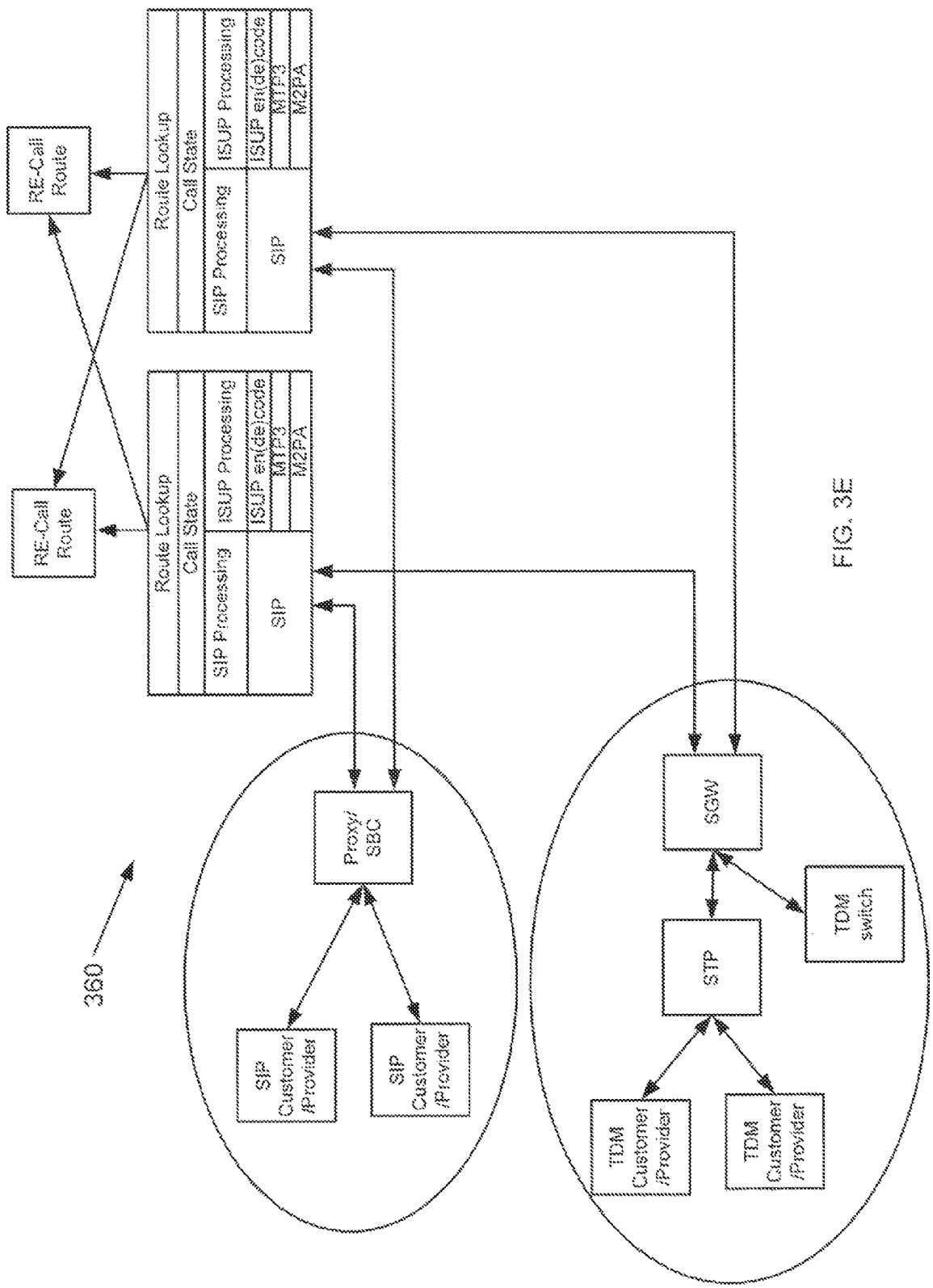
FIG. 3E is a network diagram of an example Session Initiation Protocol (SIP) network employing some of the disclosed embodiments.

The foregoing is but one example. The inventive concepts described throughout this disclosure are not intended to be limited by the example. In another example, FIG. 3E illustrates an example Session Initiation Protocol (SIP) network 360 employing some of the disclosed embodiments.

Figure 4:
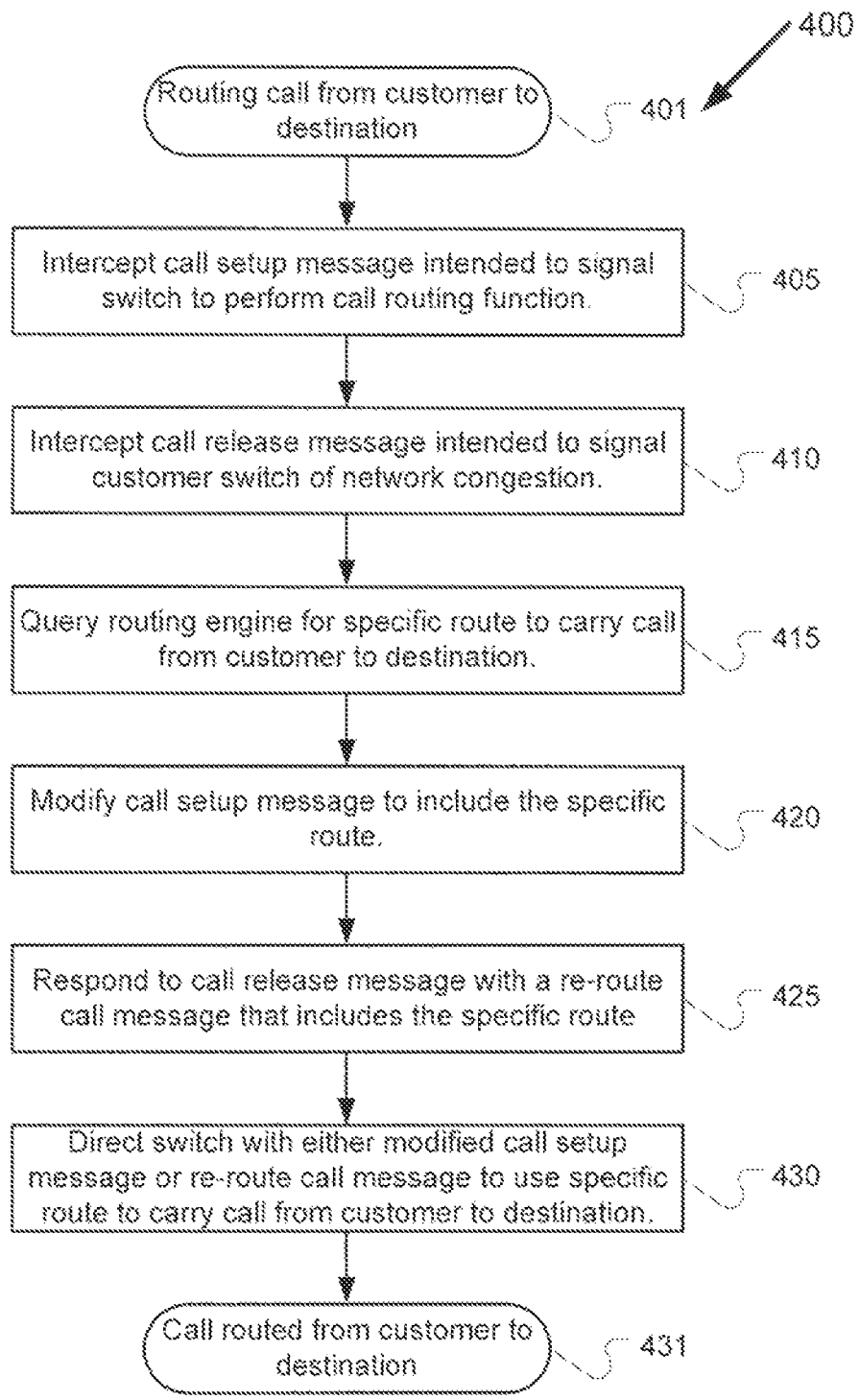
FIG. 4 is flowchart of an example process in accordance with an embodiment.

In FIG. 4, an example process 400 for routing a call from a customer to a destination is executed by an application server, such as the application server 205 of FIG. 2. The process 400 starts (401).

The process 400 intercepts (405) a call setup message (such as the call setup message 210 of FIG. 2) sent from a customer switch (such as the customer switch 215 of FIG. 2) to a switch (such as the switch 220 of FIG. 2) intended to signal the switch to perform a call routing function. The call setup message may request a call routing function be performed. The call routing function determines a route for the switch to use to carry the call to the destination. The route so determined is referred to as a switch-determined route.

The process 400 also intercepts (410) a call release message (such as the call release message 245 of FIG. 2) sent from the switch to the customer switch intended to signal the customer switch to release the call.

In response to intercepting either the call setup message or the call release message, the process 400 queries (415) a routing engine (such as the routing engine 225 of FIG. 2) with the destination of the call for a specific route over which to carry the call to the destination. The specific route is queried from a set of routes (such as the set represented by the common routing table 226 of FIG. 2) that is different from another set of routes (such as the set represented by the routing table 221 of FIG. 2) from which the call routing function determines the switch-determined route.

The process 400 modifies (420) the call setup message that is intercepted to include the specific route. The call setup message so modified is referred to as a modified call setup message (such as the modified call setup message 240 of FIG. 2).

The process 400 responds (425) to the call release message with a re-route call message (such as the re-route call message 250 of FIG. 2) that includes the specific route.

The process 400 directs (430) the switch with either the modified call setup message of the re-route call message to use the specific route to carry the call from the customer to the destination.

The process ends 431 with the call routed from the customer to the destination.

Figure 5:
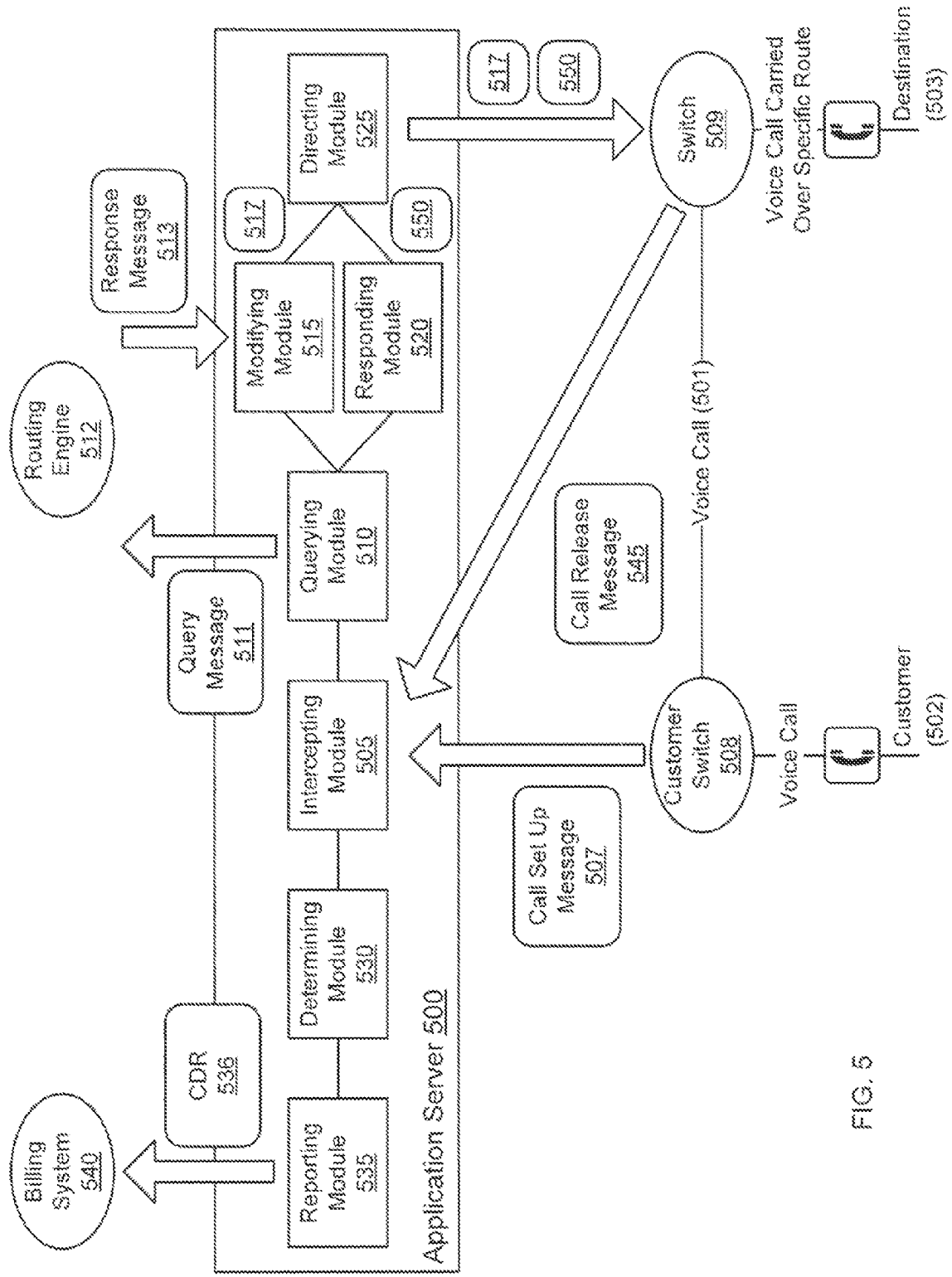
FIG. 5 is a block diagram of an example apparatus in accordance with an embodiment.

FIG. 5 illustrates an example application server 500 (such as the application server 205 of FIG. 2) to route a call 501 from a customer 502 to a destination 503. The application server 500 includes an intercepting unit/module 505, querying unit/module 510, modifying unit/module 515, responding unit/module 520, and directing unit/module 525, each communicatively coupled from one to another.

The intercepting unit/module 505 intercepts a call setup message 507 sent from a customer switch 508 to a switch 509. The intercepted call setup message 507 is intended to signal the switch 509 to perform a call routing function or to request a call routing function be performed. The intercepting unit/module 505 also intercepts a call release message 545 sent from the switch 509 to the customer switch 508. The intercepted call release message 545 is intended to signal the customer switch 508 to release the call.

In one example, the call setup message 507 and the call release message 545 are sent to and from the switch 509 operating in a time-division multiplexed (TDM) network. To intercept such messages, the intercepting unit/module 505 is configured to be networked with and to receive messages (or signals) from the TDM network. For example, the intercepting unit/module 505 is adapted with a corresponding or compatible physical and/or logical interface(s).

Typically, the call routing function determines a route for the switch 509 to use to carry the call 501 to the destination 503. The route so determined is referred to as a switch-determined route.

The querying unit/module 510 queries, e.g., with a query message 511, a routing engine 512 with the destination of the call for a specific route over which to carry the call 501 to the destination 503. In one example, the application server 500 queries the routing engine 512 operating in an Internet Protocol (IP) network. To query the routing engine 512 operating in such a network, the querying unit/module 510 is configured to be networked with and to receive messages (or signals) from the IP network. For example, the querying unit/module 510 is adapted with a corresponding or compatible physical and/or logical interface(s).

The specific route is queried from a set of routes that is different from another set of routes from which the call routing function determines the switch-determined route. The specific route is communicated to the application server 500, for example, in a response message 513. In a convenient embodiment, the querying unit/module 510 includes a sub-module to select the specific route from among routes provided by the routing engine (e.g., returned in the response message 513) in response to the querying.

The modifying unit/module 515 modifies the intercepted call setup message 507 to include the specific route. The call setup message 507 so modified is referred to as a modified call setup message 517.

The responding unit/module 520 responds to the call release message 545 with a re-route call message 550 that includes the specific route The directing unit/module 520 directs the switch 509 with either the modified call setup message 517 or the re-route call message 550 to use the specific route to carry the call 501 from the customer 502 to the destination 503.

Optionally, the application server 500 also includes a determining unit/module 530 and reporting unit/module 535. The determining unit/module 530 is communicatively coupled the intercepting unit/module 505 described above. The reporting unit/module 535 is communicatively coupled to the determining unit/module 530. The determining unit/module 530 determines a cost for carrying the call 501 from the customer 502 to the destination 503 over the specific route. The determining unit/module 530 determines the cost as a function of a rate for using the specific route and a call duration indicated (e.g., from start and stop times of the call) in an intercepted call signaling message (such as the call setup message 507). The reporting unit/module 535 reports the cost in a Call Detail Record (CDR) 536. The CDR 536 may be used for billing purposes. The reporting unit/module 535 reports the CDR 536 in a format intended to be read or otherwise processed by a billing system 540. Generally, the application server 500 may be configured to communicate or network with the billing system 550.

Alternatively, application server 500 may be a general purpose computer having a processor, memory, communication interface, etc (described in greater detail in reference to FIG. 6). The general purpose computer is transformed into the application server 500 and its components, for example, by loading instructions into the processor that cause the computer to intercept a call setup message sent from a customer switch intended to signal a switch, intercept a call setup message from the switch intended to signal the customer switch to release the call, query a routing engine for a specific route over which to carry the call to the destination, modify the call setup message that is intercepted to include the specific route, respond to the call release message that is intercepted with a re-route call message that includes the specific route, and direct the switch with either the modified call setup message or the re-route call message to use the specific route to carry the call from the customer to the destination.

Figure 6A:
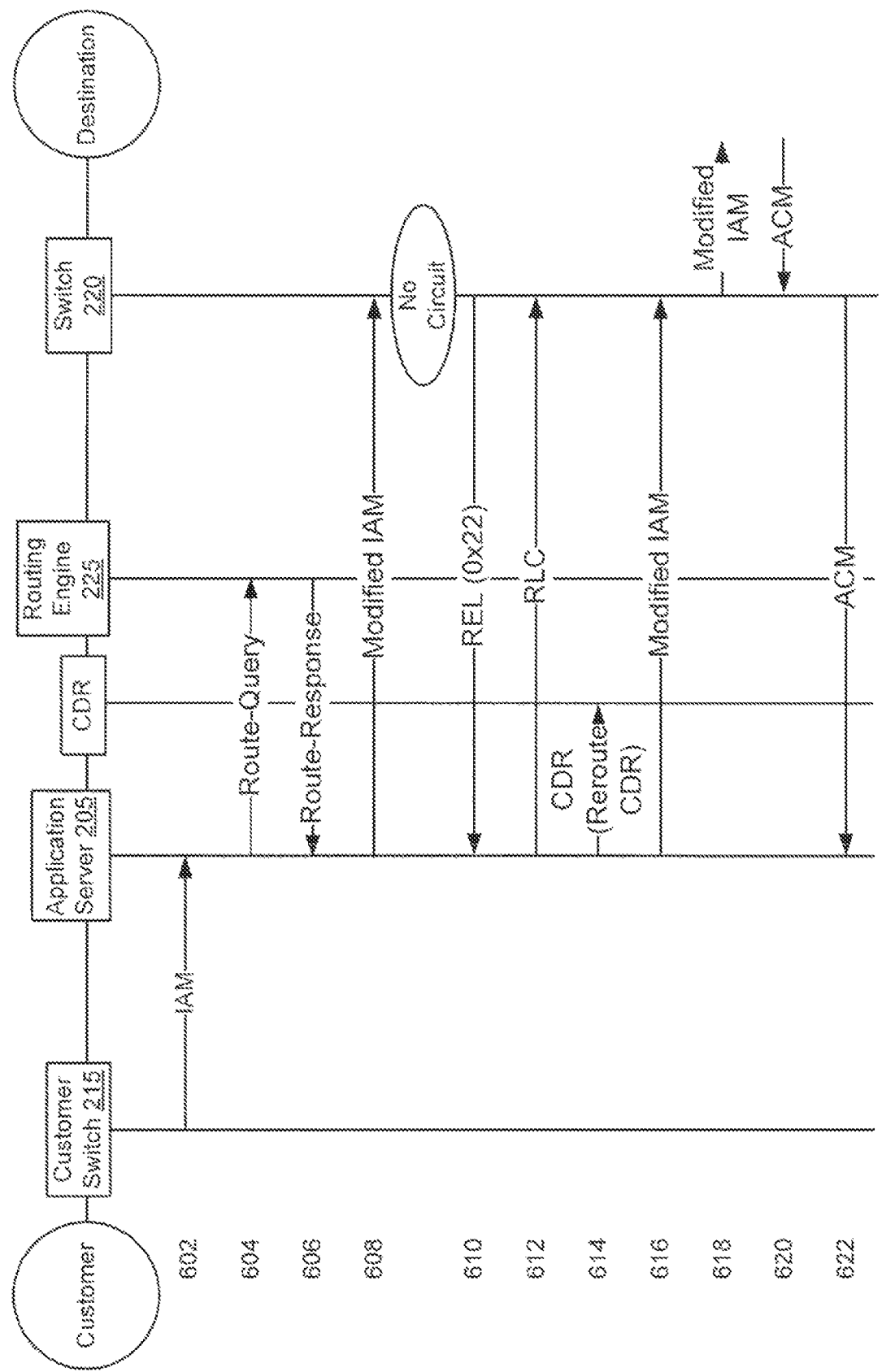
FIGS. 6A-6B are message diagrams of an example call signaling message flow.
Figure 6B:
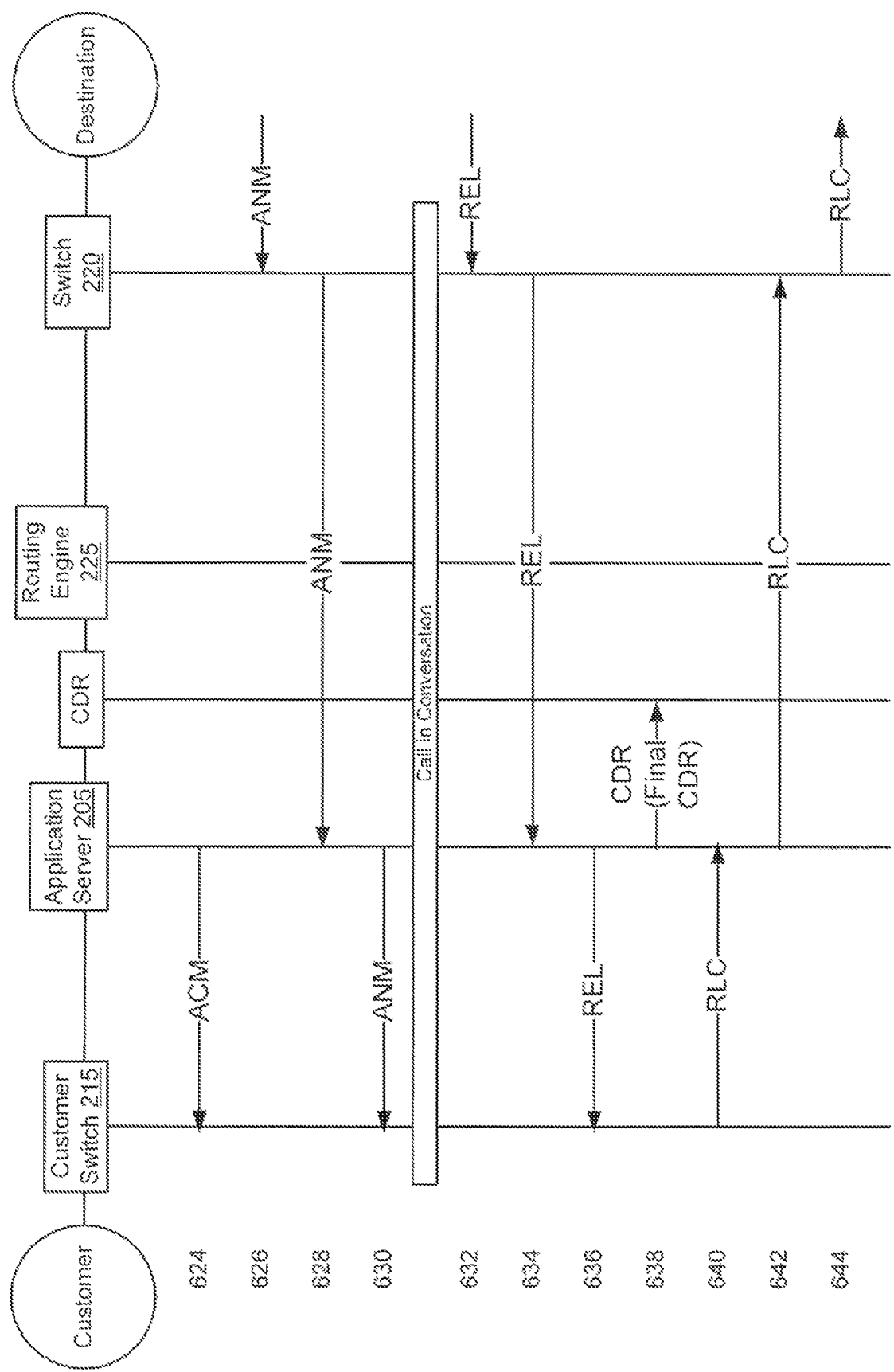

FIGS. 6A and 6B illustrate routing a call from a customer to a destination, as described above, in the context of an example call signaling message flow. Certain elements of the example network shown in FIG. 2 are illustrated at the top of the figures (viz., the application server 205, customer switch 215, and switch 220, and the routing engine 225). Below is a sequence of call signaling messages to setup and to release the call that are exchanged between the elements. Also included are messages related to routing the call from the customer to the destination as described above. In this example, the call signaling messages being exchanged are from ISUP of the SS7 set of protocols.

The customer makes the call to the destination resulting in the customer switch 215 sending an Initial Address Message (IAM) (or a call setup message).

At 602, the application server 205 intercepts the IAM sent from the customer switch 215.

At 604, the application server 205 queries the routing engine 225 on how to route the call.

At 606, the routing engine 225 responds to the application server 205 with one or more routes (or providers of routes). At 608, the application server 205 modifies the IAM to include a first route provided by the routing engine 205 resulting in a modified IAM, and forwards the modified IAM to the switch 220.

In the illustrated example, the first route is not available because for network congestion (denoted in FIG. 6A as "No Circuit").

At 610, the application server 205 intercepts a Release Message (REL) (or a call release message) sent from the switch 220 indicating "no circuit available."

At 612, the application server 205 responds with a Release Complete Message (RLC) to complete the release of a portion of the call toward the switch 220.

At 614, the application server 205 generates a re-route Call Detail Record (CDR) for the call indicating that the call is being re-routed. In FIG. 6A, the re-route CDR generated by the application server 205 is illustrated as being sent to a CDR server (or other network element tasked with processing CDRs).

At 616, the application server 205 modifies the IAM originally sent from the customer switch 215 to include a second route if provided by the routing engine 205 resulting in a modified IAM. The application server 205 forwards the modified IAM to the switch 220.

At 618, the switch 220 sends the modified IAM to the provider of the route queried or otherwise selected by the application server 205.

At 620, the switch 220 receives an Address Complete Message (ACM) indicating that the call has been delivered to the destination (or far-end).

At 622, the application server 205 intercepts the ACM forwarded by the switch 220.

At 624, the application server 205 records the time of receiving the ACM and forwards the ACM to the customer switch 215.

At 626, the switch 220 receives an Answer Message (ANM) indicating that the destination answered the call.

At 628, the application server 205 intercepts the ANM forwarded by the switch 220.

At 630, the application server 205 records the time of receiving the ANM to calculate a duration of the call (or a call duration) and forwards the ANM to the customer switch 215.

The call is connected end-to-end, i.e., from the customer to the destination, and the parties talk to each other (denoted in FIG. 6B as "Call in Conversation").

At 632, the switch 220 receives a REL indicating that the destination hung up the call.

At 634, the application server 205 intercepts the REL forwarded by the switch 220.

At 636, the application server 205 records the time of receiving the REL to calculate the duration of the call and forwards the REL to the customer switch 215.

At 638, the application server 205 generates a final CDR including the calculated call duration. In FIG. 6B, the final CDR generated by the application server 205 is illustrated as being sent to the CDR server (or other network element tasked with processing CDRs).

At 640, the application server 205 intercepts a RLC sent from customer switch 215.

At 642, the application server 205 forwards the RLC to the switch 220.

At 644, the switch 220 sends the RLC to the provider of the route and the call is released completely.

Figure 7:
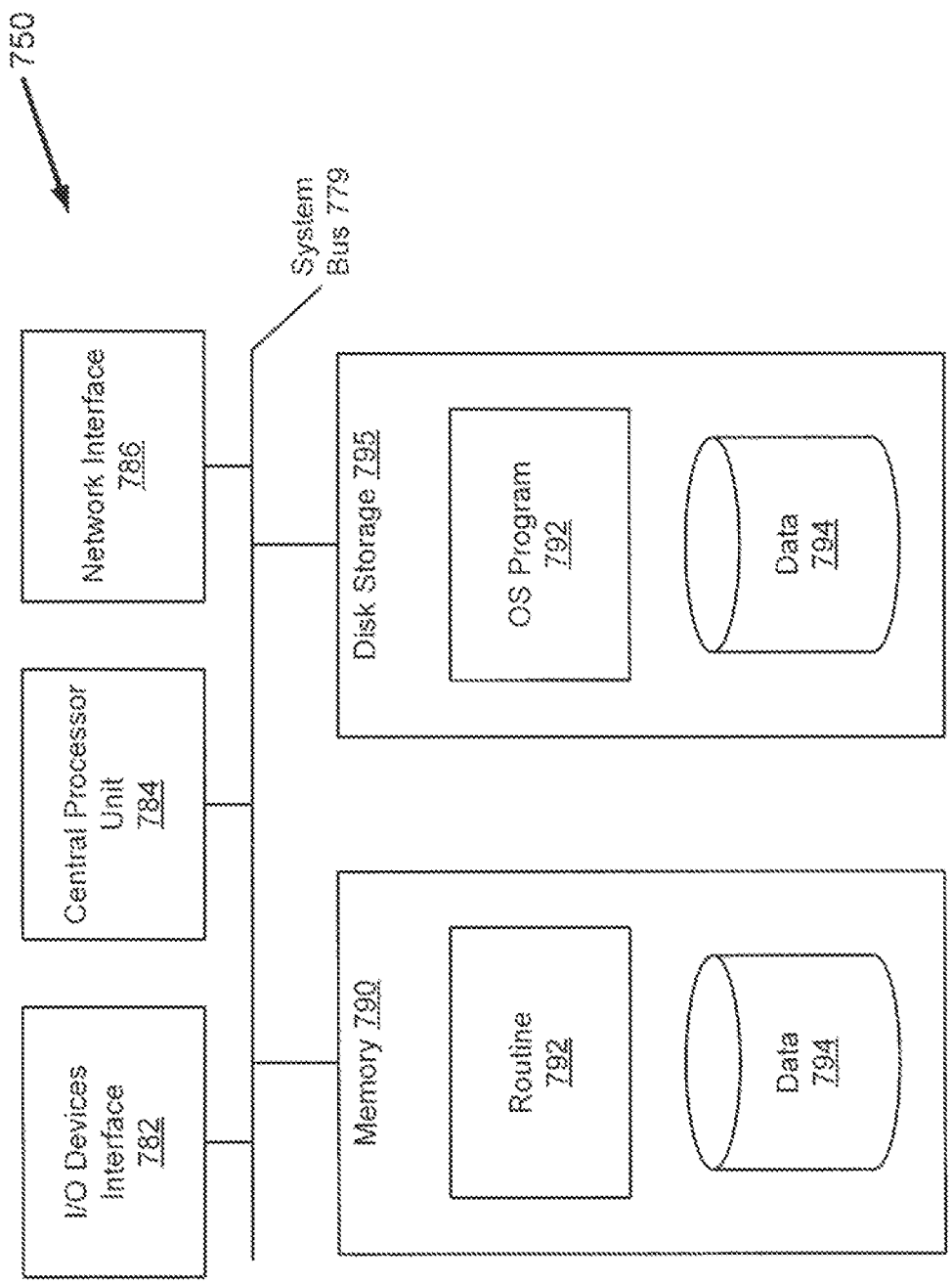
FIG. 7 is block diagram of the internal structure of a computer in which various embodiments may be implemented.

FIG. 7 is a block diagram of the internal structure of a computer 750 in which various embodiments of the present invention may be implemented. The computer 750 contains system bus 779, where a bus is a set of hardware lines used for data transfer among the components of a computer or processing system. Bus 779 is essentially a shared conduit that connects different elements of a computer system (e.g., processor, disk storage, memory, input/output ports, network ports, etc.) that enables the transfer of information between the elements. Attached to system bus 779 is I/O device interface 782 for connecting various input and output devices (e.g., keyboard, mouse, displays, printers, speakers, etc.) to the computer 750. Network interface 786 allows the computer 750 to connect to various other devices attached to a network. Memory 790 provides volatile storage for computer software instructions 792 (e.g., instructions for the process 400 of FIG. 4 for routing a call from a customer to a destination) and data 794 used to implement an embodiment of the present invention. Disk storage 795 provides non-volatile storage for computer software instructions 792 and data 794 used to implement an embodiment of the present invention. Central processor unit 784 is also attached to system bus 779 and provides for the execution of computer instructions.

In one embodiment, the processor routines 792 (e.g., instructions for the process 400 of FIG. 4 for routing a call from a customer to a destination) and data 794 are a computer program product (generally referenced 792), including a computer readable medium (e.g., a removable storage medium such as one or more DVD-ROM's, CD-ROM's, diskettes, tapes, etc.) that provides at least a portion of the software instructions for the inventive system. Computer program product 792 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 7 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for routing a call from a customer to a destination, the method comprising:
    intercepting, at an application server, a call setup message sent from a customer switch to a switch intended to signal the switch to perform a call routing function, the call routing function determines a route for the switch to use to carry the call to the destination, the route so determined is a switch-determined route;
    in response to the call setup message being intercepted, querying a routing engine with the destination of the call for a specific route over which to carry the call to the destination, the specific route queried from a set of routes that is different from another set of routes from which the call routing function determines the switch-determined route;
    modifying the call setup message to include the specific route, the call setup message so modified is a modified call setup message; and
    directing the switch with the modified call setup message to use the specific route to carry the call from the customer to the destination;
    wherein the application server performs the method without needing a service transfer point 1) to intercept the call setup message and 2) to direct the switch with the modified call setup message.

2. The method of claim 1 wherein the switch and customer switch signal each other according to a protocol;
    wherein intercepting the call setup message includes behaving in a manner similar to the switch being signaled by the customer switch to setup the call according to the protocol, the intercepting is transparent to the customer switch, and the customer switch is unaware that the call setup message is being intercepted;
    wherein directing includes behaving in a manner similar to the customer switch signaling the switch according to the protocol, the directing is transparent to the switch, and the switch is unaware of being directed by the modified call setup message.

3. The method of claim 1 wherein intercepting the call setup message includes intercepting the message to and from the switch that operates in a first network;
    wherein querying includes querying the routing engine that operates in a second network; and
    wherein directing includes directing the switch with the modified call setup message to use the specific route to carry the call from the customer to the destination located in a third network.

4. The method of claim 1 wherein intercepting the call setup message includes intercepting an out-of-band call signaling message, any one of: Signaling System Number 7 (SS7), Common Channel Signaling System 7 (CCS7), and Session Initiation Protocol (SIP).

5. The method of claim 1 wherein querying includes querying the routing engine for the specific route from the set of routes having routes in addition to those of the other set of routes.

6. The method of claim 1 wherein querying includes re-querying the routing engine with the destination of the call for an alternate route over which to carry the call to the destination, in an event the specific route is unable to carry the call to the destination.

7. The method of claim 1 wherein querying includes selecting the specific route from among routes provided by the routing engine in response to the querying.

8. The method of claim 1 wherein the destination is identified in the call setup message as a dialed number; and
wherein modifying includes appending a prefix to the dialed number, the prefix indicates the specific route to carry the call from the customer to the destination; and
directing includes directing the switch to use the specific route indicated by the prefix that is appended to the dialed number.

9. The method of claim 1 further comprising:
given an intercepted call signaling message that indicates a call duration, determining a cost for carrying the call from the customer to the destination over the specific route as a function of the call duration and a rate for using the specific route; and
reporting the cost in a Call Detail Record (CDR).

10. An apparatus to route a call from a customer to a destination, the apparatus comprising:
an intercepting module to intercept a call setup message from a customer switch to a switch intended to signal the switch to perform a call routing function or request a call routing function be performed, the call routing function determines a route for the switch to use to carry the call to the destination, the route so determined is a switch-determined route;
a querying module communicatively coupled to the intercepting module to query a routing engine with the destination of the call for a specific route over which to carry the call to the destination, the specific route is queried from a set of routes that is different from another set of routes from which the call routing function determines the switch-determined route;
a modifying module communicatively coupled to the querying module to modify the call setup message to include the specific route, the call setup message so modified is a modified call setup message;
a directing module communicatively coupled to the modifying module to direct the switch with the modified call setup message to use the specific route to carry the call from the customer to the destination;
wherein the intercepting module and the directing module are configured to operate without needing a service transfer point 1) to intercept the call setup message and 2) to direct the switch with the modified call setup message.

11. The apparatus of claim 10 wherein the switch and customer switch signal each other according to a protocol;
wherein the intercepting module is configured to behave in a manner similar to the switch being signaled by the customer switch according to the protocol, the intercepting module is transparent to the customer switch, and the customer switch is unaware that the call setup message is being intercepted; and
wherein the directing module is configured to behave in a manner similar to the customer switch signaling the switch according to the protocol, the directing module is transparent to the switch, and the switch is unaware of being directed by the modified call setup message.

12. The apparatus of claim 10 wherein the intercepting module includes an interface adapted to intercept the call setup message from the switch that operates in a first network;
wherein the querying module includes an interface adapted to query the routing engine that operates in a second network; and
wherein the directing module includes an interface adapted to direct the switch with the modified call setup message to use the specific route to carry the call from the customer to the destination located in a third network.

13. The apparatus of claim 10 wherein the intercepting module includes an interface adapted to intercept an out-of-band call signaling message, any one of:
Signaling System Number 7 (SS7), Common Channel Signaling System 7 (CCS7), and Session Initiation Protocol (SIP).

14. The apparatus of claim 10 wherein the querying module is configured to query for the specific route from the set of routes having routes in addition to those of the other set of routes.

15. The apparatus of claim 10 wherein the querying module is configured to re-query the routing engine with the destination of the call for an alternate route over which to carry the call to the destination in an event the specific route is unable to carry the call to the destination.

16. The apparatus of claim 10 wherein the querying module includes a selecting sub-module to select the specific route from among routes provided by the routing engine in response to the querying.

17. The apparatus of claim 10 wherein the destination is identified in the call setup message as a dialed number;
wherein the modifying module is configured to appending a prefix to the dialed number, the prefix indicates the specific route to carry the call from the customer to the destination; and
wherein the directing module is configured to direct the switch to use the specific route indicated by the prefix that is appended to the dialed number.

18. The apparatus of claim 10 further comprising:
a determining module communicatively coupled to the intercepting module to determine, given an intercepted call signaling message that indicates a call duration, a cost for carrying the call from the customer to the destination over the specific route as a function of the call duration and a rate for using the specific route; and
a reporting module communicatively coupled to the determining module to report the cost in a Call Detail Record (CDR).

19. A non-transitory computer readable medium having a computer readable program thereon, wherein the computer readable program when executed on an application server causes the application server to perform the steps of:
intercept a call setup message sent from a customer switch to a switch intended to signal the switch to perform a call routing function or request a call routing function be performed, the call routing function determines a route for the switch to use to carry the call to the destination, the route so determined is a switch-determined route;
in response to the call setup message being intercepted, query a routing engine with the destination of the call for a specific route over which to carry the call to the destination, the specific route is queried from a set of routes that is different from another set of routes from which the call routing function determines the switch-determined route;
modify the call setup message to include the specific route, the call setup message so modified is a modified call setup message; and
direct the switch with the modified call setup message to use the specific route to carry the call from the customer to the destination;
the application server performing the steps without needing a service transfer point 1) to intercept the call setup message and 2) to direct the switch with the modified call setup message.

* * * * *